United States Patent
Takikawa et al.

(10) Patent No.: US 10,132,384 B2
(45) Date of Patent: Nov. 20, 2018

(54) CENTRIFUGAL PENDULUM-TYPE VIBRATION ABSORBING DEVICE AND ORDER SETTING METHOD FOR THE SAME

(71) Applicant: AISIN AW CO., LTD., Anjo-shi, Aichi-ken (JP)

(72) Inventors: Yoshihiro Takikawa, Tsushima (JP); Yoichi Oi, Ama (JP); Hiroki Nagai, Anjo (JP); Kazuhiro Itou, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 261 days.

(21) Appl. No.: 15/104,767

(22) PCT Filed: Jan. 16, 2015

(86) PCT No.: PCT/JP2015/051008
§ 371 (c)(1),
(2) Date: Jun. 15, 2016

(87) PCT Pub. No.: WO2015/108130
PCT Pub. Date: Jul. 23, 2015

(65) Prior Publication Data
US 2017/0037929 A1 Feb. 9, 2017

(30) Foreign Application Priority Data
Jan. 17, 2014 (JP) ................. 2014-006768

(51) Int. Cl.
*F16F 15/14* (2006.01)
(52) U.S. Cl.
CPC ...... *F16F 15/145* (2013.01); *F16F 2228/001* (2013.01); *F16F 2232/02* (2013.01)

(58) Field of Classification Search
CPC . F16F 15/145; F16F 2228/001; F16F 2232/02
See application file for complete search history.

(56) References Cited

U.S. PATENT DOCUMENTS

| 8,161,740 | B2 | 4/2012 | Krause et al. | |
| 9,133,906 | B2 * | 9/2015 | Takikawa | F16F 15/145 |

(Continued)

FOREIGN PATENT DOCUMENTS

| DE | 102008057647 A1 | 6/2009 | |
| DE | 10 2012 215 078 A1 * | 3/2013 | F16F 15/145 |

(Continued)

OTHER PUBLICATIONS

English Abstract of JP 2016-176588, Miyajima, Oct. 2016.*
(Continued)

*Primary Examiner* — Vinh Luong
(74) *Attorney, Agent, or Firm* — Oliff PLC (57) ABSTRACT

A centrifugal pendulum vibration absorbing device includes a flange that is coupled to a driven member that is a rotary element that rotates using power from an engine and a mass body that is coupled to the flange so as to oscillate about a pendulum fulcrum PF and is designed so as to have an effective order $q_{eff}$ that is greater by a correction amount $\Delta q$ that is at least associated with the non-linearity of an order q of vibration of the flange and the mass body that is dependent on an oscillation angle $\phi$ of the mass body than an order $q_{tag}$ of vibration that is generated in the engine to be damped.

13 Claims, 8 Drawing Sheets

(56) References Cited

U.S. PATENT DOCUMENTS

| | | | |
|---|---|---|---|
| 9,133,907 B2 * | 9/2015 | Takikawa | F16F 15/173 |
| 9,915,318 B2 * | 3/2018 | Takikawa | F16F 15/173 |
| 2010/0242466 A1 | 9/2010 | Krause et al. | |
| 2012/0304808 A1 * | 12/2012 | Amano | F16F 15/1457 |
| | | | 74/574.2 |
| 2013/0133476 A1 * | 5/2013 | Kremer | F16F 15/145 |
| | | | 74/574.2 |
| 2013/0239746 A1 * | 9/2013 | Movlazada | F16F 15/145 |
| | | | 74/574.2 |
| 2014/0352290 A1 * | 12/2014 | Horita | F16F 15/145 |
| | | | 60/330 |
| 2015/0000999 A1 * | 1/2015 | Amano | F16H 45/02 |
| | | | 181/209 |
| 2016/0348779 A1 * | 12/2016 | Voegtle | F16F 15/145 |

FOREIGN PATENT DOCUMENTS

| | | | | |
|---|---|---|---|---|
| DE | 102014204153 A1 | | 10/2014 | |
| DE | 10 2015 220 419 A1 | * | 4/2017 | F16F 15/145 |
| GB | 598811 | * | 2/1948 | F16F 15/145 |
| JP | 2011-504987 A | | 2/2011 | |
| JP | 2011-220502 A | | 11/2011 | |
| JP | 2013-124682 A | | 6/2013 | |
| JP | 2013-148211 A | | 8/2013 | |
| JP | 2013-164136 A | | 8/2013 | |
| JP | 2016-176588 | * | 10/2016 | F16F 15/145 |
| WO | 2011/141246 A1 | | 11/2011 | |
| WO | 2013/125050 A1 | | 8/2013 | |

OTHER PUBLICATIONS

English Abstract of DE 10 2015 220 419 A1, Siemens et al., Apr. 2017.*
English Abstract of DE 10 2012 215 078 A1, Rusch, Mar. 2013.*

* cited by examiner

CENTRIFUGAL PENDULUM-TYPE VIBRATION ABSORBING DEVICE AND ORDER SETTING METHOD FOR THE SAME

TECHNICAL FIELD

Preferred embodiments relate to a centrifugal pendulum-type vibration absorbing device including a support member that is coupled to a rotary element that rotates by means of power from a drive device and a mass body that is coupled to the support member so as to oscillate about a pendulum fulcrum and an order setting method for the centrifugal pendulum-type vibration absorbing device.

BACKGROUND ART

Conventionally, as a power transmission system including this type of centrifugal pendulum-type vibration absorbing device, a power transmission system is known which includes at least an input member, an output member, a vibration damping device that is disposed within a chamber that can be filled at least partially with an operation medium, in particular, an oil, and a centrifugal pendulum-type rotation speed adaptable dynamic vibration absorber that is coupled to the vibration damping device and wherein power is transmitted between the drive device and a driven device (refer to PTL 1, for example). In this power transmission system, the rotation speed adaptable dynamic vibration absorber is designed, in relation to the effect of oil, to an effective order $q_{eff}$ that is greater by a predetermined order offset value qF than an order q of vibration that is excited by the drive device. Then, the order offset value qF is determined so as to change in proportion to a change in the order q of vibration excited so as not to coincide with the order q of vibration excited.

CITATION LIST

Patent Literature

PTL 1: JP-T-2011-504987

SUMMARY

The setting method of the effective order $q_{eff}$ described in PTL 1 described above is understood to be such that the effective order $q_{eff}$ is set in consideration of a resistance generated by a relative motion between the mass body and the rotating oil, that is, the viscous resistance. However, the method described in PTL 1 lacks the theoretical backing evidence. According to the studies carried out by the inventors, it has been found out that the effect of viscous resistance on the oscillation of the mass body is small under the presence of a liquid such as working oil. Consequently, even though the order of vibration of the mass body provided in the centrifugal pendulum-type vibration absorbing device is set in the way described in PTL 1, it is not possible to enhance the vibration absorbing performance of the centrifugal pendulum-type vibration absorbing device. On the contrary, depending upon a situation, there may be caused fears that the vibration absorbing performance is deteriorated.

Then, a main object of preferred embodiments is to improve the vibration absorbing performance of a centrifugal pendulum-type vibration absorbing device by setting more properly the order of vibration of a mass body in the centrifugal pendulum-type vibration absorbing device.

A centrifugal pendulum-type vibration absorbing device according to preferred embodiments includes a support member that is coupled to a rotary element that rotates by means of power from a drive device and a mass body that is coupled to the support member so as to oscillate about a pendulum fulcrum, in which the centrifugal pendulum-type vibration absorbing device is designed so as to have an effective order $q_{eff}$ that is greater by a correction amount that is at least associated with the non-linearity of an order of the centrifugal pendulum-type vibration absorbing device that is dependent on an oscillation angle φ of the mass body than an order $q_{tag}$ of vibration that is generated in the drive device to be damped.

It is known that when assuming that a distance from a rotational center of the rotary element to the pendulum fulcrum is "R" and a distance from the pendulum fulcrum to a center of gravity of the mass body is "r", the order of vibration of a centrifugal pendulum-type vibration absorbing device including a mass body that oscillates about a pendulum fulcrum (mass body) is expressed as $q=\sqrt{(R/r)}$ in a simple fashion. The simplified expression that expresses the order of vibration like this is obtained on the understanding that the oscillation angle (rotational angle about the pendulum fulcrum, that is, the amplitude) of the mass body is extremely small. As a result of the inventors making every effort in carrying out studies on centrifugal pendulum-type vibration absorbing devices, it has been found out that since an oscillation angle of a mass body of a centrifugal pendulum-type vibration absorbing device when a rotary element and a support member rotate about a rotational center is too great to be ignored, it is not possible to set properly the order of vibration of the mass body by regarding the oscillation angle of the mass body as being extremely small. Consequently, in case the centrifugal pendulum-type vibration absorbing device is designed so as to have an effective order $q_{eff}$ that is greater by a correction amount that is at least associated with the non-linearity of an order of the centrifugal pendulum-type vibration absorbing device that is dependent on an oscillation angle φ of the mass body than an order $q_{tag}$ of vibration that is generated in the drive device to be damped in consideration of the oscillation angle of the mass body, it is possible to improve the vibration absorbing performance of the centrifugal pendulum-type vibration absorbing device by setting the order of vibration more properly.

DESCRIPTION OF EMBODIMENTS

Next, referring to the drawings, an embodiment will be described.

Figure 1:
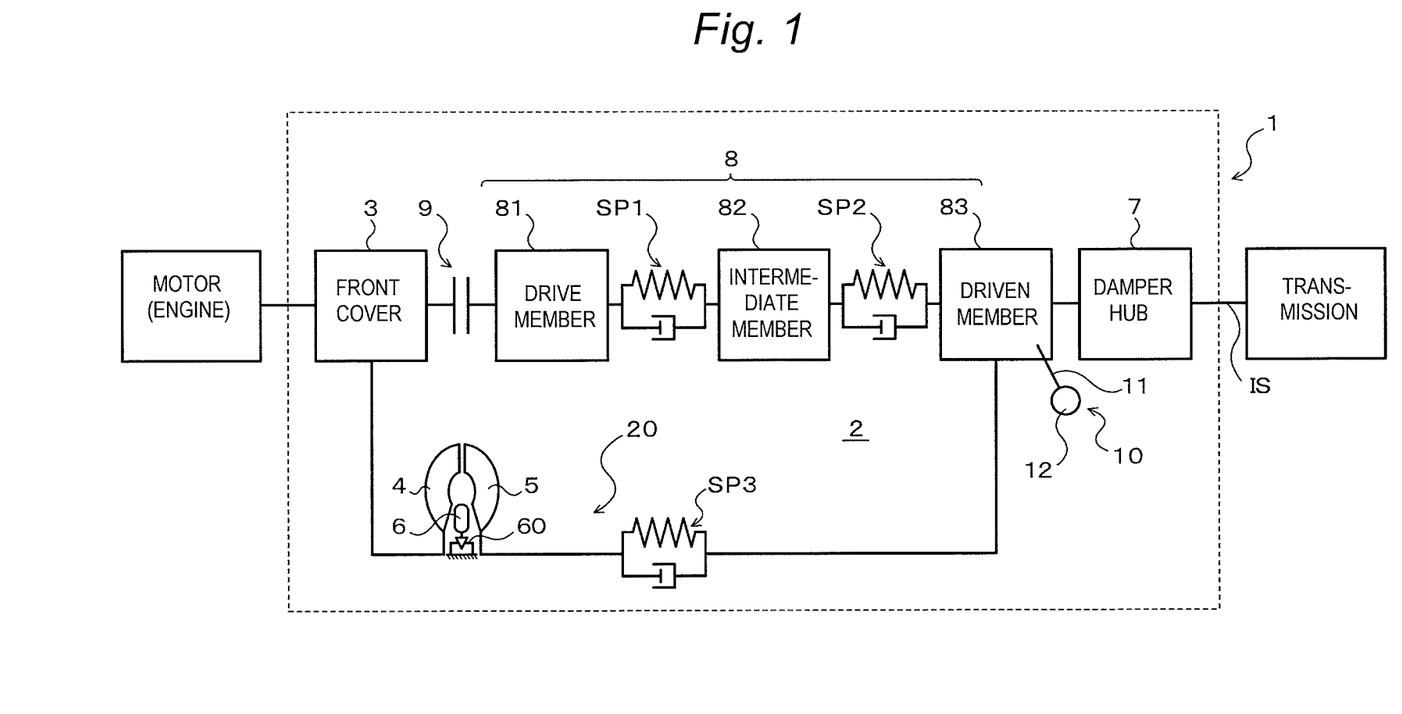
FIG. 1 is a schematic block diagram showing a starting system that includes a centrifugal pendulum-type vibration absorbing device according to an embodiment.

FIG. 1 is a schematic block diagram showing a starting system 1 that includes a centrifugal pendulum-type vibration absorbing device 10 according to an embodiment. The starting system 1 shown in FIG. 1 is mounted on a vehicle that includes an engine (internal combustion engine) as a drive device so as to transmit power from the engine to a transmission such as an automatic transmission (AT) or a continuously variable transmission (CVT). In addition to the centrifugal pendulum-type vibration absorbing device 10, the starting system 1 includes a front cover (input member) 3 that is coupled to a crankshaft of the engine, a pump impeller (input-side fluid transmission element) 4 that is fixed to the front cover 3, a turbine runner (output-side fluid transmission element) 5 that can rotate coaxially with the pump impeller 4, a stator 6 that rectifies a flow of working oil (working fluid) from the turbine runner 5 to the pump impeller 4, a damper hub (output member) 7 that is fixed to an input shaft IS of the transmission, a damper mechanism 8 that is connected to the damper hub 7, and a single-plate friction lock-up clutch 9 that has a lock-up piston, not shown, that is coupled to the damper mechanism 8.

The pump impeller 4 and the turbine runner 5 face each other, and the stator 6 is disposed between the pump impeller 4 and the turbine runner 5 so as to rotate coaxially with the pump impeller 4 and the turbine runner 5. The stator 6 is set so as to rotate only in one direction by a one-way clutch 60. These pump impeller 4, turbine runner 5 and stator 6 form a torus (annular flow path) through which the working oil (fluid) is allowed to circulate in an interior of a fluid transmission chamber (liquid chamber) 2 that is defined by the front cover 3 and a pump shell of the pump impeller 4 and function as a torque converter having a torque boosting function. In the starting system 1, the pump impeller 4 and the turbine runner 5 may be made to function as a fluid coupling with the stator 6 and the one-way clutch 60 omitted, The damper mechanism 8 has a drive member 81 as an input element that is coupled to the lock-up piston of the lock-up clutch 9 so as to rotate together with the lock-up piston, a plurality of first coil springs (first elastic bodies) SP1, an intermediate member (intermediate element) 82 that is coupled to the drive member 81 via the first coil springs SP1, a plurality of second coil springs (second elastic bodies) SP2 that have, for example, a higher rigidity (spring constant) than that of the first coil springs SP1 and that are disposed apart in a radial direction of the starting system 1 from the first coil springs SP1, and a driven member (output element) 83 that is coupled to the intermediate member 82 via the second coil springs SP2.

The drive member 81 has a plurality of abutment portions that are brought individually into abutment with ends of the corresponding first coil springs SP1. The abutment portions of the drive member 81 are disposed individually between the adjacent first coil springs SP1 so as to be brought into abutment with both the first coil springs SP1 with the damper mechanism 8 mounted. The intermediate member 82 has a plurality of first abutment portions that are brought into abutment with the other ends of the corresponding first coil springs SP1 and a plurality of second abutment portions that are brought into abutment with end portions of the corresponding second coil springs SP2. The first abutment portions of the intermediate member 82 are disposed individually between the adjacent first coil springs SP1 so as to be brought into abutment with both the first coil springs SP1 with the damper mechanism 8 mounted. The second coil springs SP2 are disposed individually between the two adjacent second abutment portions of the intermediate member 82 with the damper mechanism 8 mounted. One of the two second abutment portions is brought into abutment with one end of the second coil spring SP2, and the other of the two second abutment portions is brought into abutment with the other end of the second coil spring SP2. The driven member 83 has a plurality of abutment portions that are brought into abutment with end portions of the corresponding second coil springs SP2 and is fixed to the damper hub 7. The second coil springs SP2 are disposed individually between the two adjacent abutment portions of the driven member 83 with the damper mechanism 8 mounted. One of the two abutment portions is brought into abutment with one end of the second coil spring SP2, and the other of the two adjacent abutment portions is brought into abutment with the other end of the second coil spring SP2.

In addition, in the starting system 1 of this embodiment, the turbine runner 5 is coupled to the driven member 83 that is an output element of the damper mechanism 8 via a plurality of third coil springs (third elastic bodies) SP3. The plurality of third coil springs SP3 and the turbine runner 5 make up a dynamic damper 20. With this configuration, when the lock-up clutch 9 is engaged (locked up), the vibration of the whole of the damper mechanism 8 can be absorbed well by both the centrifugal pendulum-type vibration absorbing device 10 and the dynamic damper 20.

The lock-up clutch 9 operates on a hydraulic pressure from a hydraulic pressure control device, not shown. The lock-up clutch 9 can lock up and release the coupling of the front cover (input member) 3 with the damper hub 7, that is, the input shaft IS of the transmission via the damper mechanism 8. The lock-up piston, not shown, that makes up the lock-up clutch 9 is supported so as not only to move axially but also to rotate by the damper hub 7, for example. An annular frictional material is securely affixed to an outer circumferential surface and a surface facing the front cover 3 of the lock-up piston. The drive member 81 is coupled to an outer circumferential portion of the lock-up piston. It is noted that the starting system 1 may be configured so as to include a multi-plate friction lock-up clutch in place of the single-plate friction lock-up clutch 9.

The centrifugal pendulum-type vibration absorbing device 10 includes, as shown in FIG. 1, a support member (flange) 11 that is coupled (fixed) coaxially to the driven member 83, which is the rotary element of the damper mechanism 8, and a plurality of (for example, three to four) mass bodies 12 that are individually supported so as to oscillate by the support member 11 and that are disposed adjacent to one another in a circumferential direction. The centrifugal pendulum-type vibration absorbing device 10 is accommodated in the interior of the fluid transmission chamber (liquid chamber) 2 that is defined by the front cover 3 and the pump shell of the pump impeller 4 and that holds the working oil therein. Then, in the centrifugal pendulum-type vibration absorbing device 10, the plurality of mass bodies 12 oscillate in the same direction relative to the support member 11 in the interior of the fluid transmission chamber 2 that is filled with the working oil as the support member 11 rotates, whereby a vibration having an opposite phase to that of the vibration (resonance) of the driven member 83 of the damper mechanism 8 is given to the driven member 83. This enables vibrations to be absorbed (damped) by the centrifugal pendulum-type vibration absorbing device 10 from the front cover 3 to the damper hub 7.

In this embodiment, a plurality of first guide notch portions, not shown, are formed on the support member 11 in such a way that two (a pair of) first guide notch portions are given to each of the mass bodies 12. Then, two (a pair of) second guide notch portions, not shown, are formed on each of the mass bodies 12. The support member 11 and the mass bodies 12 are coupled to each other via, for example, guide rollers (none of which is shown) that each include a first roller (a roller) that rolls on an inner circumferential surface of one of the first guide notch portions of the support member 11 and a second roller (a roller) that rolls on an inner circumferential surface of the second guide notch portion of one of the mass bodies 12, and the first roller and the second roller are integrated into the guide roller. Each of the pairs of first guide notch portions of the support member 11 that correspond to one of the mass bodies 12 is formed into an elongated hole that is laterally asymmetrical or laterally symmetrical and whose axis is a curve that is convex outwards in a radial direction of the support member 11. This pair of elongated holes is disposed symmetrical with respect to an oscillating center line (straight line that includes a rotational center (axis) of the driven member 83 (support member 11) and a pendulum fulcrum) of the mass body 12. In contrast with this, the pair of second guide notch portions of each mass body 12 is formed into an elongated hole that is laterally asymmetrical or laterally symmetrical and whose axis is a curve that is convex towards the center of the support member 11. This pair of elongated holes is disposed symmetrical with respect to the oscillating center line of the mass body 12.

By adopting this configuration, in the centrifugal pendulum-type vibration absorbing device 10 of this embodiment, by the guide rollers being guided by both the first guide notch portions of the support member 11 and the second guide notch portions of the mass bodies 12, the mass bodies 12 are allowed to be revolved about a pendulum fulcrum as the support member 11 rotates, and also the mass bodies 12 are allowed to rotate about their own centers of gravity as the mass bodies 12 oscillate within their oscillating ranges. As a result of this, according to the centrifugal pendulum-type vibration absorbing device 10, it is possible to dampen vibrations that are transmitted to the support member 11 by making use of not only the oscillation of the mass bodies 12 about the pendulum fulcrum but also the rotational moments of the mass bodies 12 about their own centers of gravity. It is noted that the first guide notch portions may be formed on the support member 11 in such a way that one first guide notch portion is given to one mass body 12 and that the second guide notch portions may be formed in such a way that one second guide notch portion is given to one mass body 12. In addition, the centrifugal pendulum-type vibration absorbing device may be configured as a so-called bifilar device that includes as the support member 11 two arms that support one mass body so as to oscillate.

Next, a method of setting an order of vibration of the mass body 12 of the centrifugal pendulum-type vibration absorbing device 10 will be described by reference to FIGS. 2 to 8.

Figure 2:
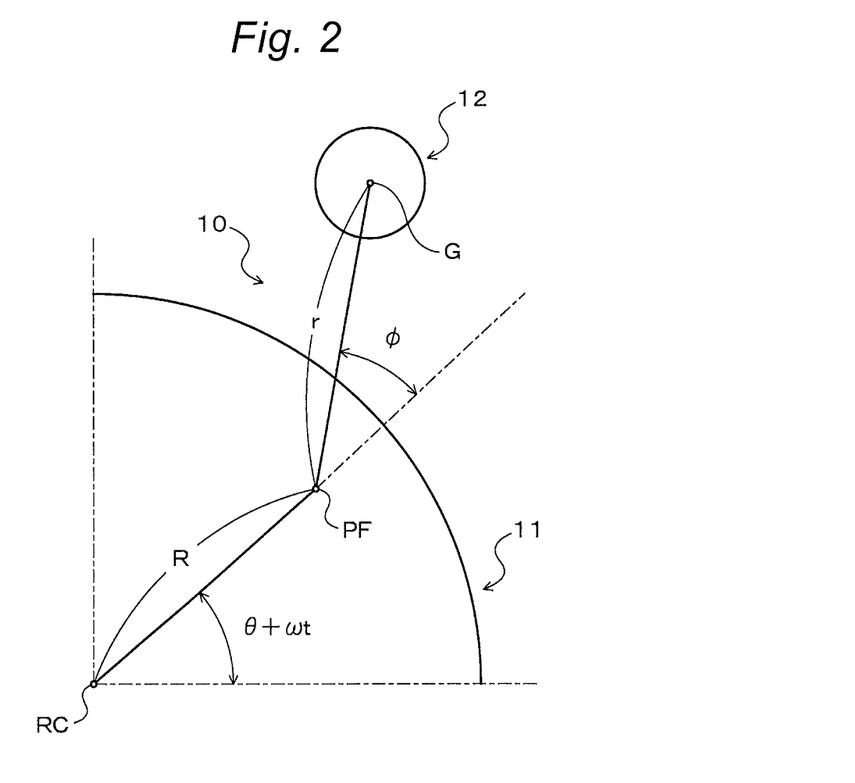
FIG. 2 is a schematic diagram showing the centrifugal pendulum-type vibration absorbing device according to the embodiment.

As shown in FIG. 2, an equation of motion of the centrifugal pendulum-type vibration absorbing device 10, which includes the support member 11 that is coupled to (integrated with) the rotary element such as the driven member 83 that is rotated by means of, for example, power from the engine and the mass body 12 that is coupled to the support member 11 so as to oscillate about the pendulum fulcrum PF, will be expressed generally by a mathematical expression below (1), where, in the expression (1), "m" denotes the mass of the mass body 12x, "R" denotes a distance from the rotational center RC of the rotary element and the support member 11 to the pendulum fulcrum PF, "r" denotes a distance from the pendulum fulcrum PF to the center of gravity G of the mass body 12x, "ω" denotes an angular velocity of the rotary element and the support member 11, "θ" denotes a rotational angle of the rotary element and the support member 11 about the rotational center RC, "φ" denotes an oscillation angle of the mass body 12 (center of gravity of the mass body 12) that oscillates about the pendulum fulcrum PF as the support member 11 rotates, that is, a rotational angle of the mass body 12 about the pendulum fulcrum PF, and "c" denotes a constant.

[Math 1]

$$m \cdot r \cdot \ddot{\phi} + m \cdot (R \cdot \cos \phi + r) \cdot (\ddot{\theta} + \omega)^2 \cdot \sin \phi = -c \cdot \dot{\phi} \quad (1)$$

When assuming that the oscillation angle φ of the mass body 12 is minute (φ<<1), the expression (1) above can be modified into a linear equation that is expressed by an expression (2) below, and an oscillating frequency f of the mass body 12 can be expressed by an expression (3) below from the expression (2). Then, an order q of vibration of the mass body 12 can be obtained as expressed by an expression (4) below from an expression (3). Thus, assuming that an order of vibration that is generated in the engine to be dampened is "$q_{tag}$," it is considered that the vibration that is generated in the engine can be dampened by the centrifugal pendulum-type vibration absorbing device 10 by determining the distances R and r so as to satisfy $q_{tag} \approx \sqrt{R/r}$.

[Math 2]

$$r \cdot \ddot{\phi} + R \cdot \omega^2 \cdot \phi = 0 \quad (2)$$

$$f = \frac{\omega}{2\pi} \cdot \sqrt{\frac{R}{r}} \quad (3)$$

$$q = \sqrt{\frac{R}{r}} \quad (4)$$

The expression (4) that expresses the order q of vibration of the mass body 12 can be obtained by regarding the oscillation angle φ (amplitude) of the mass body 12 as being extremely small. However, as a result of the present inventors making every effort in carrying out studies on the setting of an order of vibration of the mass body in the centrifugal pendulum-type vibration absorbing device, it has been found out that since the oscillation angle of the mass body of the centrifugal pendulum-type vibration absorbing device that results when the rotary element and the support member rotate about the rotational center is too great to be ignored, it is not possible to set properly the order of vibration of the mass body by regarding the oscillation angle of the mass body as being extremely small in the way described above. Namely, with specifications of the centrifugal pendulum-type vibration absorbing device 10 determined based on the order $q_{tag}$ of vibration that is generated in the engine to be dampened and the order q of vibration of the mass body 12 that is obtained from the expression (4) above, in the event that the oscillation angle $\phi$ of the mass body 12 increases, a deviation is generated between the order $q_{tag}$ of vibration that is generated in the engine to be dampened and the order q of vibration of the mass body 12, resulting in fears that the centrifugal pendulum-type vibration absorbing device 10 cannot dampen well the vibration generated in the engine. Based on this fact, in preferred embodiments, the oscillation angle $\phi$ of the mass body 12 is determined to be taken into consideration in setting the order q of vibration of the mass body 12.

When assuming that the mass body 12 oscillates to such an extent that cannot be ignored, if the small term is ignored, the expression (1) above can be modified into a non-linear equation as expressed by an expression (5) below. An oscillating frequency f of the mass body 12 can be expressed by an expression (6) below from the expression (5). In case the expression (6) is modified into an expression (7) below, the order q of vibration of the mass body 12 can be obtained from the expression (7) as an order that is expressed by an expression (8) below. Namely, in case the other elements than $\sqrt{(r/r)}$ in a second term of the expression (8) are substituted by "k" as shown by an expression (9) below, the order q of vibration can be expressed as $q=k*\sqrt{R/r}$, where in the expressions (6) to (9), "$\phi_{max}$" denotes a maximum oscillation angle (oscillation angle when the amplitude of the mass body 12 is maximum) of the mass body 12 (center of gravity of the mass body 12) that is obtained by experiments and analyses.

[Math 3]

$$r \cdot \ddot{\phi} + R \cdot \omega^2 \cdot \sin\phi = 0 \tag{5}$$

$$f = \frac{\omega}{\pi^2} \cdot \sqrt{\frac{R}{r}} \cdot \int_0^{\frac{\pi}{2}} \frac{1}{\sqrt{1 - \sin^2\frac{\phi_{max}}{2} \cdot \sin^2\phi}} d\phi \tag{6}$$

$$f = \frac{\omega}{2\pi} \cdot \sqrt{\frac{R}{r}} \cdot \frac{2}{\pi} \cdot \int_0^{\frac{\pi}{2}} \frac{1}{\sqrt{1 - \sin^2\frac{\phi_{max}}{2} \cdot \sin^2\phi}} d\phi \tag{7}$$

$$q = \sqrt{\frac{R}{r}} \cdot \frac{2}{\pi} \cdot \int_0^{\frac{\pi}{2}} \frac{1}{\sqrt{1 - \sin^2\frac{\phi_{max}}{2} \cdot \sin^2\phi}} d\phi = k \cdot \sqrt{\frac{R}{r}} \tag{8}$$

$$k = \frac{2}{\pi} \cdot \int_0^{\frac{\pi}{2}} \frac{1}{\sqrt{1 - \sin^2\frac{\phi_{max}}{2} \cdot \sin^2\phi}} d\phi \tag{9}$$

Thus, in case the order q of vibration of the mass body 12 of the centrifugal pendulum-type vibration absorbing device 10 is determined according to the expression (8) above by employing the coefficient k above and in consideration of the oscillation angle $\phi$ of the mass body 12 based on the order $q_{tag}$ of vibration generated in the engine to be dampened, the distance R from the rotational center RC of the rotary element and the support member 11 to the pendulum fulcrum PF and the distance r from the pendulum fulcrum PF to the center of gravity G of the mass body 12x, the order q of vibration of the mass body 12 can be set more properly, thereby making it possible to enhance the vibration absorbing performance of the centrifugal pendulum-type vibration absorbing device 10. Namely, determining the value R/r according to the maximum oscillation angle $\phi_{max}$ of the mass body 12 based on the expression (8) makes it possible for the order q of vibration of the mass body 12 of the centrifugal pendulum-type vibration absorbing device 10 to be set more properly than for the same order to be set in consideration of the oscillation angle $\phi$ of the mass body 12 of the centrifugal pendulum-type vibration absorbing device 10 when the rotary element and the support member 11 rotate about the rotational center.

Figure 3:
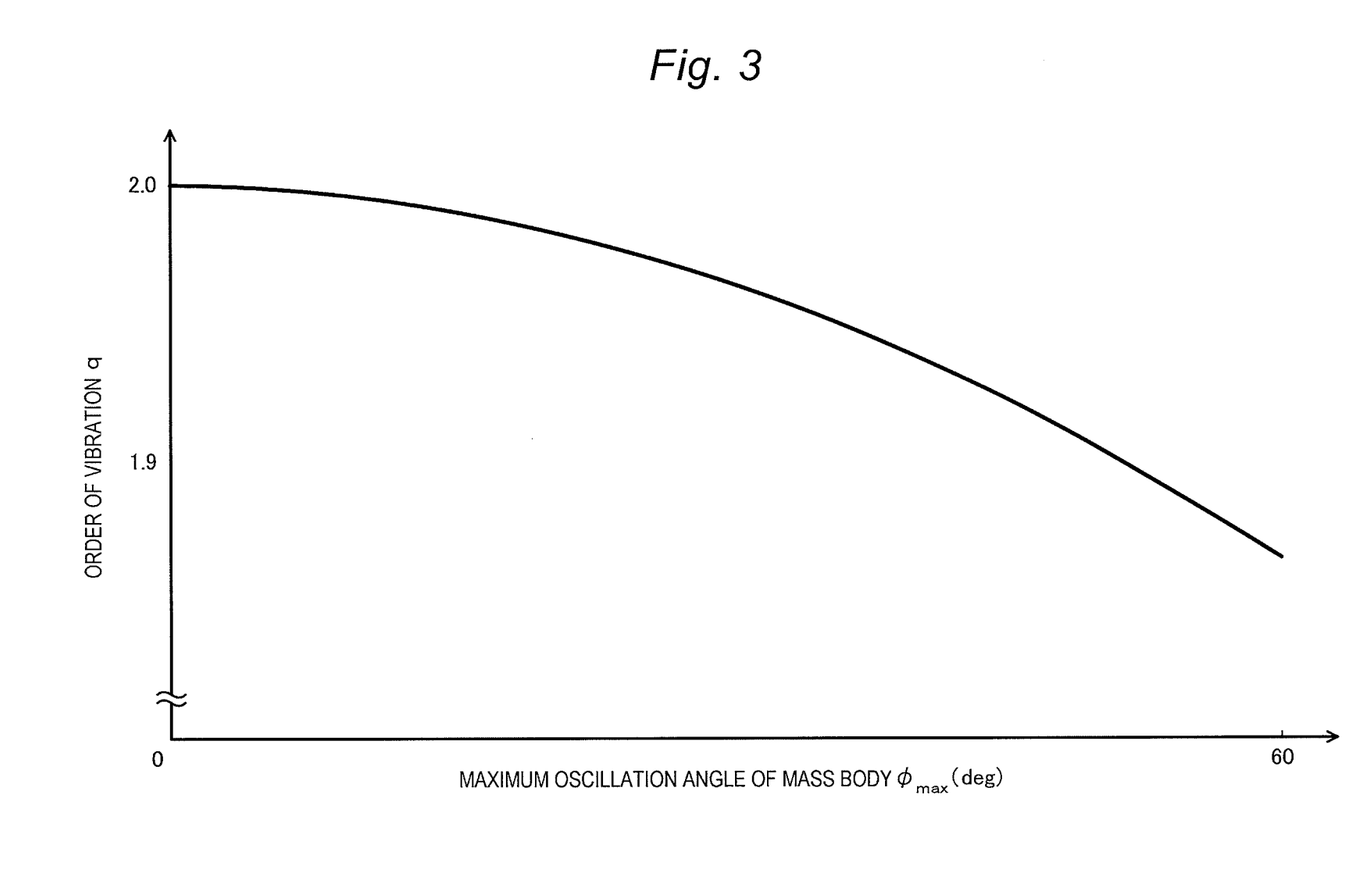
FIG. 3 is an explanatory diagram illustrating a method of setting an order of vibration of a mass body that makes up the centrifugal pendulum-type vibration absorbing device.

In addition, in the event that the distance R from the rotational center RC of the rotary element and the support member 11 to the pendulum fulcrum PF and the distance r from the pendulum fulcrum PF to the center of gravity G of the mass body 12x take individually constant values, the order q of vibration that is obtained from the expression (8) decreases non-linearly (decreases gradually) as the maximum oscillation angle $\phi_{max}$ of the mass body 12 increases, as shown in FIG. 3. Namely, the coefficient k in the expression (8) decreases as the maximum oscillation angle $\phi_{max}$ of the mass body 12 increases. Thus, the order q of vibration of the mass body 12 can be set more properly by setting the value R/r so as to increase as the maximum oscillation angle $\phi_{max}$ of the mass body 12 increases than when the same order is set in consideration of the oscillation angle $\phi$.

Then, the centrifugal pendulum-type vibration absorbing device 10 should be designed so that the order q of vibration that is obtained from the expression (8) satisfies a relational expression:

$$q_{tag}-0.2 \leq q \leq q_{tag}+0.2 \tag{10},$$

and more preferably, $$q_{tag}-0.1 \leq q \leq q_{tag}+0.1 \tag{11}.$$

That is, it is possible to set the order q of vibration of the mass body 12 more properly in consideration of the influence of a production tolerance, too, by determining parameters such as the distances R, r so that the expression (10) or (11) is satisfied. However, the centrifugal pendulum-type vibration absorbing device 10 may be designed so that the order q of vibration that is obtained from the expression (8) coincides completely with the order $q_{tag}$ of vibration that is generated in the engine to be dampened or may be designed so that the order q of vibration is contained in a narrow range defined about the order $q_{tag}$ (for example, a range defined as $q_{tag} \pm 0.05$).

Here, in the event that the distances R, r are determined so that $k*\sqrt{(r/r)}=q_{tag}$ is satisfied after the theoretical maximum oscillation angle $\phi_{max}$ of the mass body 12 is substituted in the expression (8), the vibration level is reduced, whereby it is assumed that the actual oscillation angle $\phi$ of the mass body 12 becomes smaller than the maximum oscillation angle $\phi_{max}$ thereof. Consequently, in the event that the centrifugal pendulum-type vibration absorbing device 10 is set using the expression (8), at first, the target oscillation angle $\phi_{tag}$ ($<\phi_{max}$) that is the oscillation angle of the mass body 12 that results when the rotation speed of the engine is such as to reduce the vibration level most is determined in advance through analyses (parameter studies). Then, as shown in an expression (8') below, the maximum oscillation angle $\phi_{max}$ is substituted by the target oscillation angle $\phi_{tag}$, whereafter the distances R, r should be determined so that $k*\sqrt{(r/R)}=q_{tag}$ is satisfied. With this configuration, the order q of vibration of the mass body 12 (centrifugal pendulum-type vibration absorbing device 10) that results when the oscillation angle $\phi$ of the mass body 12 is the target oscillation angle $\phi_{tag}$ becomes the order $q_{tag}$ of vibration that is generated in the engine to be dampened, whereby the vibration level resulting when the engine speed corresponds to the target oscillation angle $\phi_{tag}$ can be reduced extremely well. Further, the target oscillation angle $\phi_{tag}$ should be determined so as to fall within a range from 30° or greater and 70° or smaller.

[Math 4]

$$q = \sqrt{\frac{R}{r}} \cdot \frac{2}{\pi} \cdot \int_0^{\frac{\pi}{2}} \frac{1}{\sqrt{1 - \sin^2\frac{\phi_{tag}}{2} \cdot \sin^2\phi}} d\phi = k \cdot \sqrt{\frac{R}{r}} \quad (8')$$

Figure 4:
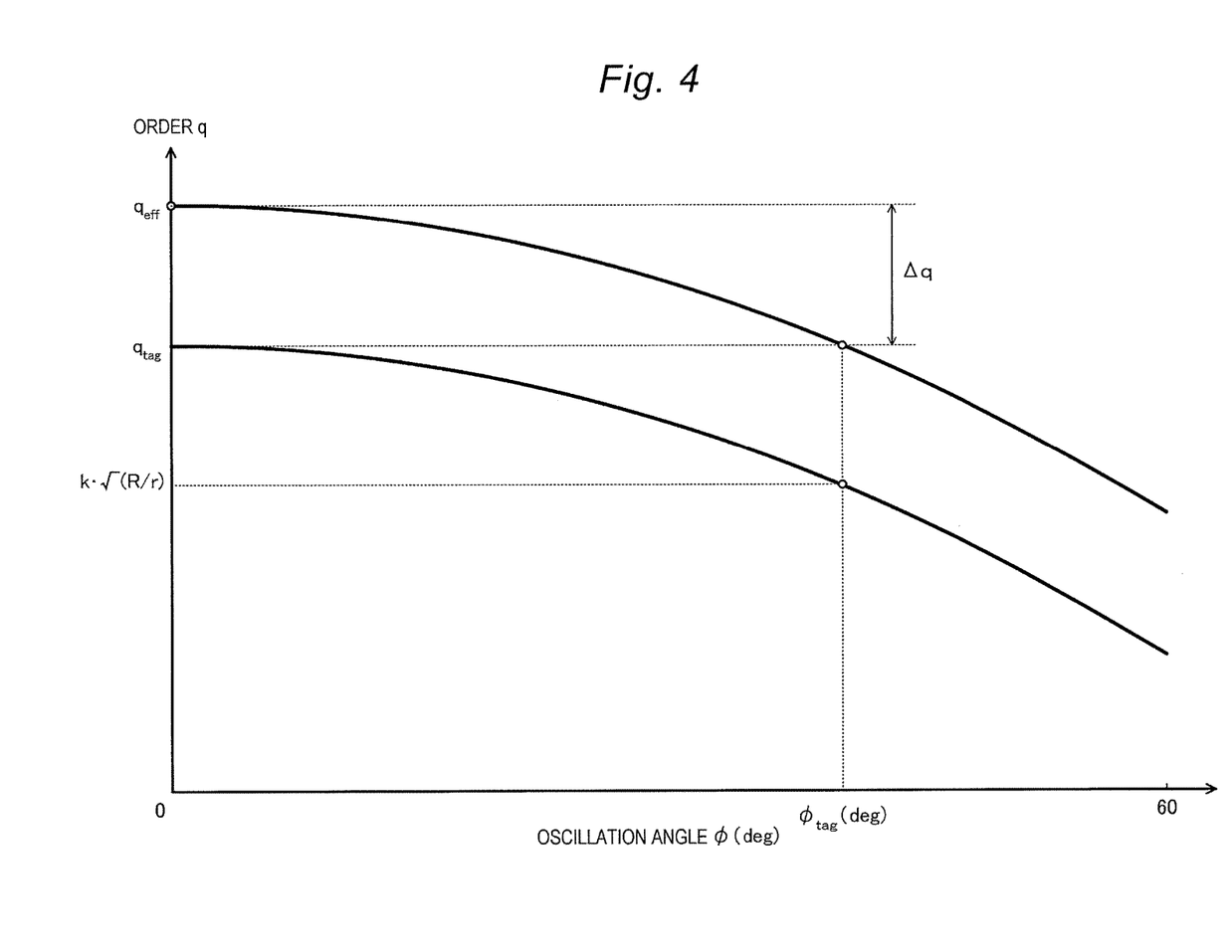
FIG. 4 is an explanatory diagram illustrating the method of setting the order of vibration of the mass body that makes up the centrifugal pendulum-type vibration absorbing device.
Figure 5:
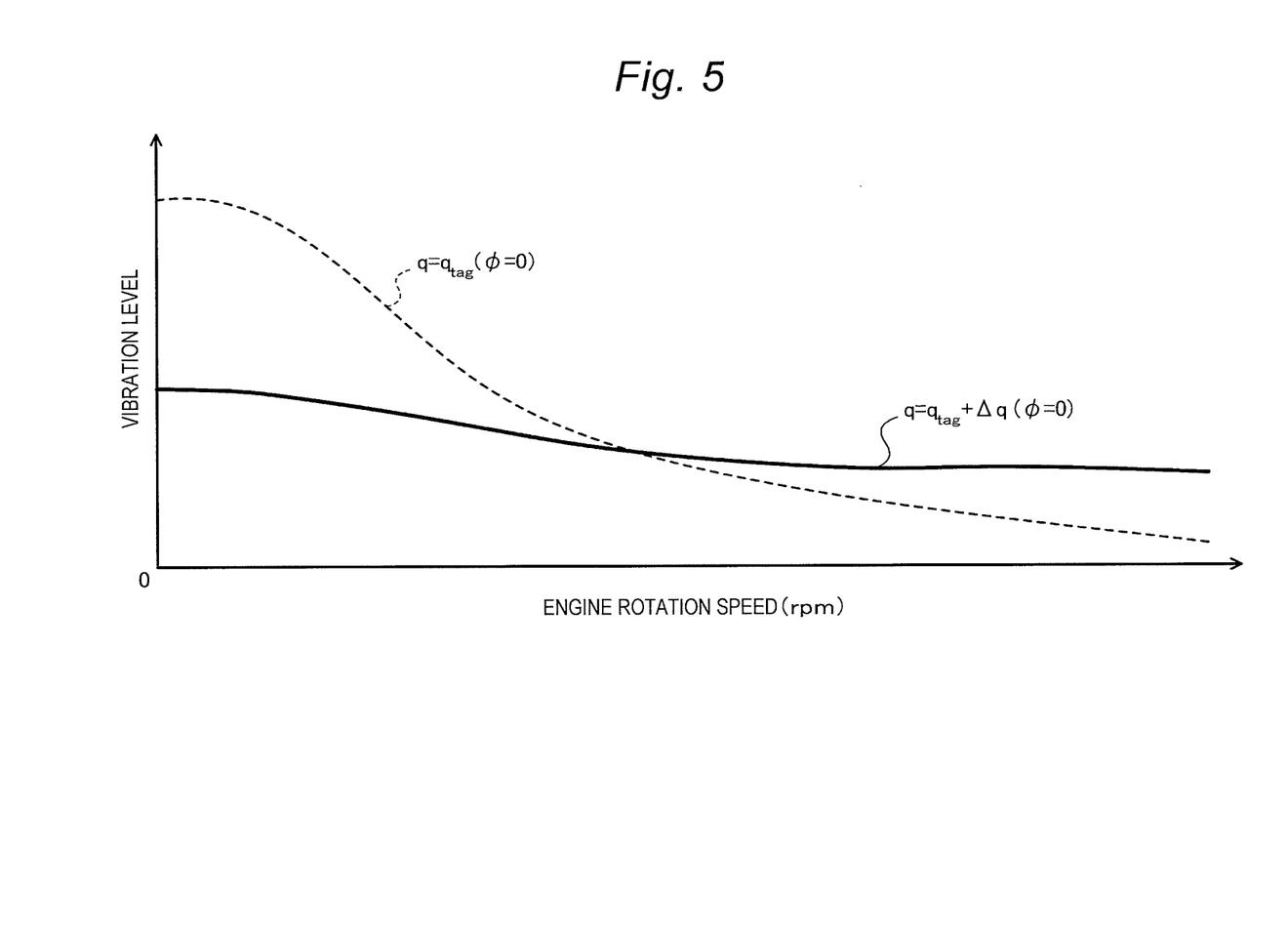
FIG. 5 is an explanatory diagram showing a vibration damping performances of the centrifugal pendulum-type vibration absorbing device when the oscillation angle of the mass body is taken into consideration and is not taken into consideration.

In the event that the order q of vibration becomes the order $q_{tag}$ of vibration that is generated in the engine to be dampened when the oscillation angle $\phi$ of the mass body 12 is the target oscillation angle $\phi_{tag}$, a curve of the order q of vibration in which the oscillation angle $\phi$ shown in an expression (8') is a variable is offset to a positive side as a whole so that $q=q_{tag}$ when $\phi=\phi_{tag}$, as shown in FIG. 4. In this case, when assuming that an order of vibration of the mass body 12 (centrifugal pendulum-type vibration absorbing device 10) that results when the oscillation angle $\phi$ is zero ($\phi=0°$) is an "effective order $q_{eff}$", as is seen from FIG. 4, a relational expression like one below is obtained:

$q_{eff}=q_{tag}+\{q_{tag}-k*\sqrt{(R/r)}\}$.

In this relational expression, "$q_{tag}-k*\sqrt{(R/r)}$" can be regarded as a correction amount $\Delta q$ (positive value) for the order $q_{tag}$. That is, the centrifugal pendulum-type vibration absorbing device 10 that is designed so that the order q of vibration becomes the order $q_{tag}$ when the oscillation angle of the mass body 12 is the target oscillation angle $\phi_{tag}$ has the effective order $q_{eff}$ that is greater by the correction amount $\Delta q$ that is at least associated with the non-linearity of an order q of vibration like those shown in FIGS. 3 and 4 that is dependent on the oscillation angle $\phi$ of the mass body 12 than the order $q_{tag}$ of vibration that is generated in the engine to be dampened. Then, in the centrifugal pendulum-type vibration absorbing device 10 that has the effective order $q_{eff}$ that is greater by the correction amount $\Delta q$ than the order $q_{tag}$ of vibration that is generated in the engine to be dampened, as indicated by a solid line in FIG. 5, the vibration absorbing performance in an area where the engine rotation speed is low can be enhanced extremely well in comparison with one that does not take the oscillation angle $\phi$ of the mass body 12 into consideration (one in which $q=q_{tag}$ when $\phi=0$. Refer to a broken line in FIG. 5). The effective order $q_{eff}$ denotes the order of vibration of the mass body 12 (centrifugal pendulum-type vibration absorbing device 10) when the oscillation angle $\phi$ is zero ($\theta=0°$), and therefore, the centrifugal pendulum-type vibration absorbing device 10 may be set based on the understanding that $q_{eff}=\sqrt{(R/r)}$ from the expression (4).

As described above, in the centrifugal pendulum-type vibration absorbing device 10, the correction amount $\Delta q$ may be determined based on a coefficient k that is determined from the target oscillation angle $\phi_{tag}$ in such a way as expressed by an expression (9') below and the order $q_{tag}$ of vibration that is generated in the engine to be dampened so that the order q of vibration becomes the order $q_{tag}$ of vibration when the oscillation angle $\phi$ of the mass body 12 is the target oscillation angle $\phi_{tag}$. In this case, the coefficient k in the expressions (8') and (9') decreases more as the maximum oscillation angle $\phi_{max}$ of the mass body 12 increases more, and therefore, the correction amount $\Delta q$ should be determined so as to increase more as the target oscillation angle $\phi_{tag}$ increases more. Further, the correction amount should be determined so as to fall within a range from 0.05 or greater to 0.20 or smaller. Then, the effective order $q_{eff}$ denotes the order of vibration of the mass body 12 (centrifugal pendulum-type vibration absorbing device 10) when the oscillation angle $\phi$ is zero ($\phi=0°$) and varies with the distance R from the rotational center RC to the pendulum fulcrum PF and the distance r from the pendulum fulcrum PF to the center of gravity G of the mass body 12, as can be understood from the expression (4). Consequently, understanding that $q_{eff}=\sqrt{(R/r)}$ is established, the distance R and the distance r may be determined from the effective order $q_{eff}$.

[Math 5]

$$k = \frac{2}{\pi} \cdot \int_0^{\frac{\pi}{2}} \frac{1}{\sqrt{1 - \sin^2\frac{\phi_{tag}}{2} \cdot \sin^2\phi}} d\phi \quad (9')$$

On the other hand, in the centrifugal pendulum-type vibration absorbing device 10 described above that is disposed in the interior of the liquid chamber that is the fluid transmission chamber 2 holding the working oil, it has been found out that the oscillation of the mass body 12 under the presence of the working oil (liquid) is influenced greatly by a force produced by a centrifugal oil pressure (centrifugal liquid pressure) that is generated within the fluid transmission chamber 2 in association with the rotation of the rotary element such as the driven member 83 that is rotated by the power from the engine (and the support member 11). Consequently, in setting the order q of vibration of the mass body 12, as will be described below, the force should be taken into consideration that is exerted on the mass body 12 by the centrifugal oil pressure (centrifugal liquid pressure) that is generated within the fluid transmission chamber 2 (liquid chamber) in association with the rotation of the support member 11 and the like.

Figure 6:
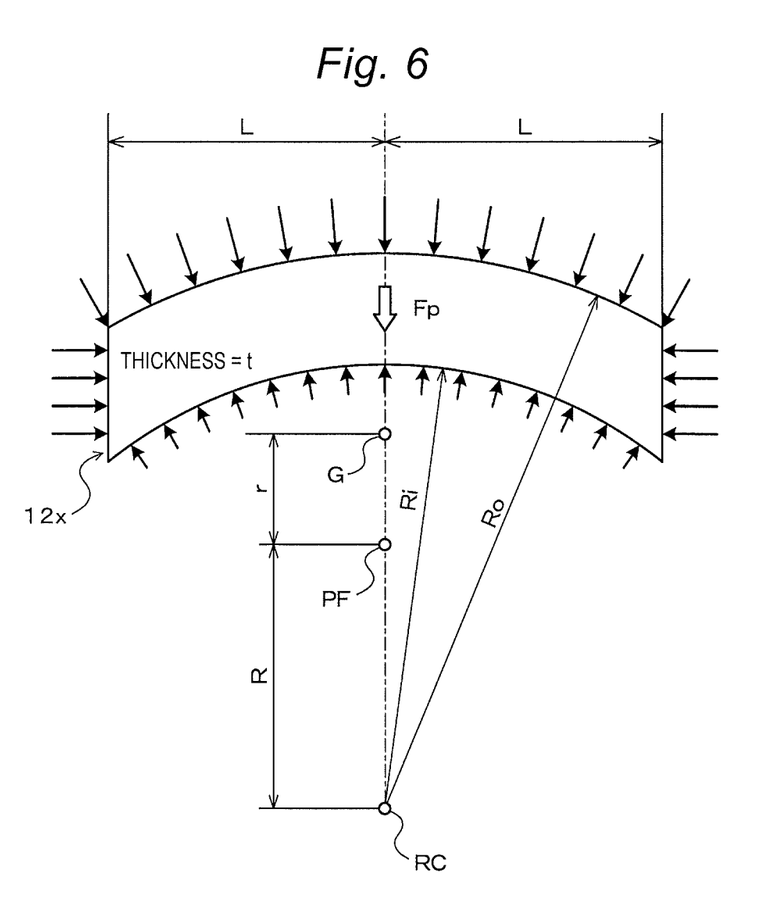
FIG. 6 is an explanatory diagram illustrating the method of setting the order of vibration of the mass body that makes up the centrifugal pendulum-type vibration absorbing device.

Here, consideration is given to a force that is generated by the centrifugal liquid pressure that acts on an arc-shaped mass body 12x as shown in FIG. 6 when the mass body 12x oscillates about a pendulum fulcrum PF without rotating about a center of gravity thereof, in association with the rotation of the rotary element such as the driven member 83. The mass body 12x shown in FIG. 6 has a cylindrical outer circumferential surface that is centered at a rotational center RC of the rotary element (support member), a concavely cylindrical inner circumferential surface that is centered at the rotational center RC, two side surfaces that are parallel individually to an oscillation center line (refer to an alternate long and short dash line in the figure) and a uniform thickness. A force Fp that is generated by the centrifugal liquid pressure that acts on the mass body 12x configured in the way described above is expressed by an expression (12) below when assuming that a distance from the rotational center RC to the outer circumferential surface (radius of curvature) of the mass body 12x is "Ro," a distance from the rotational center RC to the inner circumferential surface (radius of curvature) of the mass body 12x is "Ri," the thickness of the mass body 12x is "t," a length of the mass body 12x from the oscillation center line to left and right end portions is "L," a rotational angular velocity of the rotary element is "ω," and the density of the liquid such as the working oil is "ρ."

[Math 6]

$$Fp = \rho \cdot \omega^2 \cdot t \cdot L \cdot (Ro^2 - Ri^2) \tag{12}$$

In addition, since when the rotary element that is the driven member 83 rotates, since a centrifugal force Fc acts on the mass body 12x, a force F that acts on the mass body 12x when the mass body 12x oscillates about the pendulum fulcrum PF as the rotary element rotates is expressed by an expression (13) below when assuming that the mass of the mass body 12x is "m," a distance from the rotational center RC to the pendulum fulcrum PF is "R," and a distance from the pendulum fulcrum PF to the center of gravity G of the mass body 12x is "r." Then, when assuming that a value that results by dividing the force Fp generated by the centrifugal liquid pressure that acts on the mass body 12x by a square of rotational angular velocity ω and dividing further by a product of the mass m and the distance r and nondimensionalizing the resulting quotient is "α" as in an expression (14) below, the force F acting on the mass body 12x is expressed by an expression (15) below.

[Math 7]

$$F = Fc + Fp = m \cdot R \cdot \omega^2 - \rho \cdot \omega^2 \cdot t \cdot L \cdot (Ro^2 - Ri^2) \tag{13}$$

$$= m \cdot r \cdot \omega^2 \cdot \left[ \frac{R}{r} - \frac{\rho \cdot t \cdot L \cdot (Ro^2 - Ri^2)}{m \cdot r} \right]$$

$$\alpha = \frac{\rho \cdot t \cdot L \cdot (Ro^2 - Ri^2)}{m \cdot r} \tag{14}$$

$$F = m \cdot r \cdot \omega^2 \cdot \left( \frac{R}{r} - \alpha \right) \tag{15}$$

Further, assuming that the oscillation angle of the mass body 12x (center of gravity G of the mass body 12x) when the mass body 12x oscillates about the pendulum fulcrum PF in association with the rotation of the support member 11, that is, the rotational angle of the mass body 12x about the pendulum fulcrum PF is "φ," the equation of motion of the centrifugal pendulum-type vibration absorbing device that includes the mass body 12x is expressed by an expression (16) below. In the expression (16), a right-hand side term is a viscosity term indicating the effect of a viscous resistance generated by a relative motion between the mass body and the rotating liquid (working oil), and "c" is a constant. In addition, the viscosity term can be expressed by an expression (17) below by substituting the viscosity term in the expression (16) with an appropriate model, and the expression (16) can be modified into an expression (18) below by using the relationship of the expression (17). In the expression (17), "μ" is a viscosity coefficient, "k" is a coefficient that is determined from the viscosity of the liquid and the oscillation frequency of the mass body, and "A" is a surface area of the mass body 12x.

[Math 8]

$$m \cdot r \cdot \ddot{\phi} + m \cdot r \cdot \omega^2 \cdot \left( \frac{R}{r} - \alpha \right) \cdot \phi = -c \cdot \dot{\phi} \tag{16}$$

$$c \cdot \dot{\phi} = -\mu \cdot \kappa \cdot A \cdot (R - r) \cdot \dot{\phi} \tag{17}$$

$$\ddot{\phi} + \frac{\mu \cdot \kappa \cdot A \cdot (R + r)}{m \cdot r} \cdot \dot{\phi} + \omega^2 \left( \frac{R}{r} - \alpha \right) \cdot \phi = 0 \tag{18}$$

Then, by substituting a natural frequency of the mass body 12x that is obtained from the expression (18) with a nondimensionalized value "β" that indicates the viscosity term, an expression (19) below can be obtained that indicates an order $q_x$ of vibration of the mass body 12x that oscillates about the pendulum fulcrum PF without revolving about the center of gravity thereof under the presence of the liquid. According to the studies carried out by the present inventors, however, it is found out that the effect of the viscous resistance against the oscillation of the mass body under the presence of the liquid such as the working oil is extremely small. Consequently, since "β" in the expression (19) can be ignored, the order $q_x$ of vibration of the mass body 12x that oscillates about the pendulum fulcrum PF without revolving about the center of gravity thereof under the presence of the liquid can be obtained as expressed by an expression (20) below. As a result, when both the oscillation angle φ of the mass body 12 and the force that acts on the mass body 12 by a centrifugal oil pressure (centrifugal liquid pressure) generated in the fluid transmission chamber 2 (liquid chamber) in association with the rotation of the support member 11 and the like are taken into consideration, the order q of vibration of the mass body 12 can be obtained as expressed by an expression (21) below. In the expression (21), "k" is determined by the expression (9) or the expression (9') above.

[Math 9]

$$q_x = \sqrt{\frac{R}{r} - \alpha - \beta} \tag{19}$$

$$q_x = \sqrt{\frac{R}{r} - \alpha} \tag{20}$$

$$q = k \cdot \sqrt{\frac{R}{r} - \alpha} \tag{21}$$

In obtaining a value α by dividing the force Fp generated by the centrifugal liquid pressure that acts on the mass body by a square of the rotational angular velocity ω and dividing further by a product of the mass m and the distance r, in case the shape of the mass body is relatively simple as of the mass body 12x described above, the force Fp that acts on the mass body by the centrifugal liquid pressure can be obtained easily and accurately by determining the force Fp by using a density ρ of the liquid and a difference in surface area between the outer circumferential surface and the inner circumferential surface of the mass body. In addition, in case the mass body has a complex shape, the force Fp should be obtained by executing a numerical calculation while taking the shape of the mass body into consideration.

In the centrifugal pendulum-type vibration absorbing device 10, the mass body 12 is coupled to the support member 11 so as not only to oscillate about the pendulum fulcrum PF but also to revolve about the center of gravity G thereof. Then, the order q of vibration of the mass body 12 in this type of centrifugal pendulum-type vibration absorbing device 10 can be set as will be described below by treating the motion of the mass body 12 as the motion of a mass body in a so-called roller-type centrifugal pendulum-type vibration absorbing device.

Figure 7:
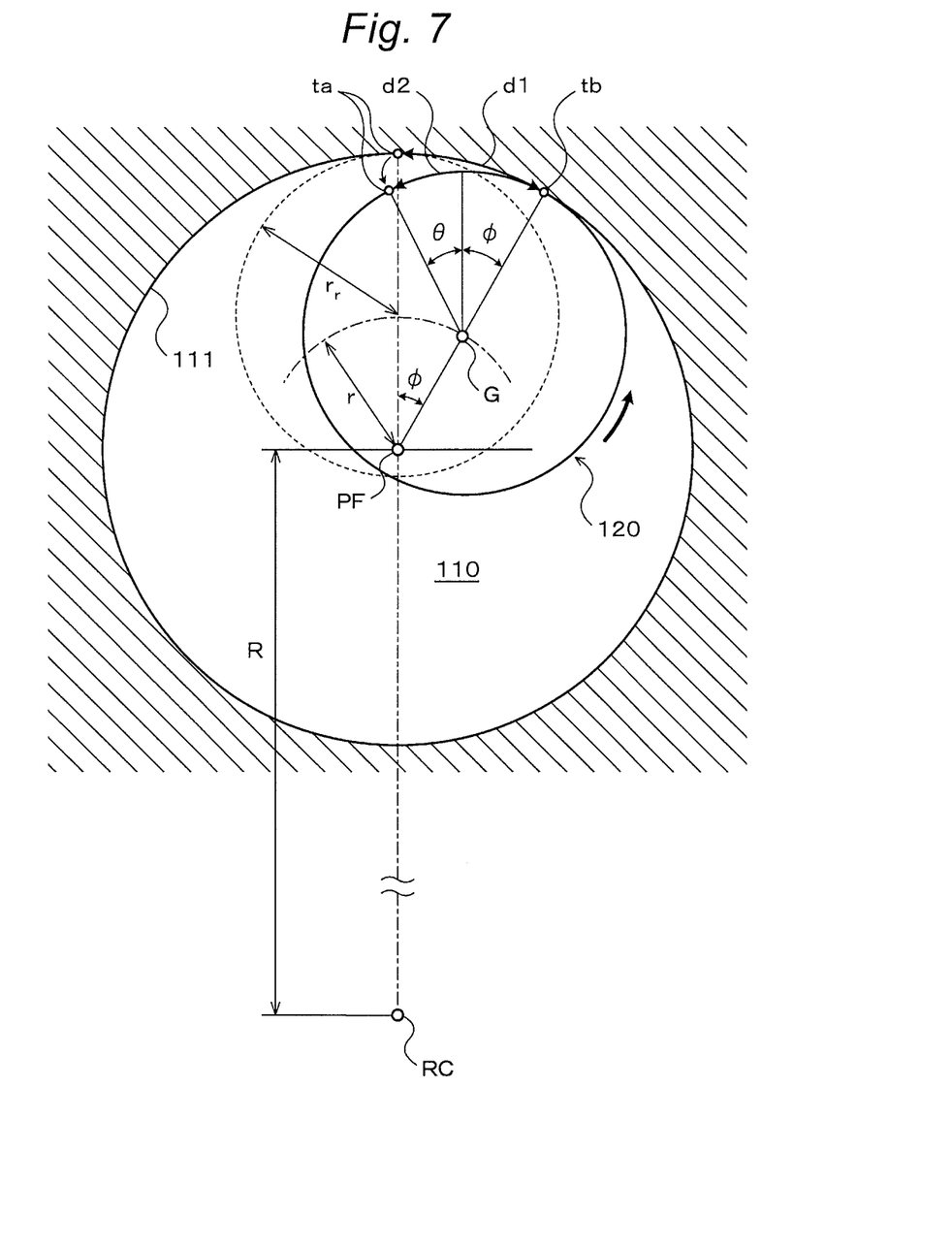
FIG. 7 is an explanatory diagram illustrating the method of setting the order of vibration of the mass body that makes up the centrifugal pendulum-type vibration absorbing device.

The roller-type centrifugal pendulum-type vibration absorbing device includes, as shown in FIG. 7, a guide notch portion 110 (in an example shown in FIG. 7, a circular opening) that is formed in a member that corresponds to the support member 11 of the centrifugal pendulum-type vibration absorbing device 10 and a roller (roller) 120 that rolls on a guide surface 111 that is an inner circumferential surface (concave circumferential surface in the example shown in FIG. 7) of the guide notch portion 110. In the roller-type centrifugal pendulum-type vibration absorbing device shown in FIG. 7, the roller 120 acting as a mass body rolls on the guide surface 111 that is a curved surface while revolving a center of gravity G (axis) thereof. Consequently, the motion of the roller-type centrifugal pendulum-type vibration absorbing device is divided into a translating motion (sliding motion) along the guide surface that does not involve the rotation of the roller about the center of gravity thereof and a rotational motion of the roller about the center of gravity thereof. These motions can be treated as a motion in which the rotational motion of the roller about the center of gravity thereof is added to the motion of the roller that oscillates only about the pendulum fulcrum without revolving about the center of gravity thereof.

Here, as has already been described above, when assuming that the distance from the rotational center RC to the pendulum fulcrum PF is "R" and the distance from the pendulum fulcrum PF to the center of gravity G of the mass body is "r", the order of vibration of the mass body in the centrifugal pendulum-type vibration absorbing device including the mass body that oscillates about the pendulum fulcrum without revolving about the center of gravity thereof is expressed as $\sqrt{(R/r)}$ in a simple fashion. In contrast with this, it is known that the order of vibration of the roller 120 of the roller-type centrifugal pendulum-type vibration absorbing device is simply expressed as $\sqrt{(2*R)/(3*r)}$. Then, the present inventors have paid attention to a difference (reduction) between $\sqrt{(2*R)/(3*r)}$ and $\sqrt{(R/r)}$.

Then, based on the understanding that the translating motion of the roller 120 along the guide surface 111 corresponds to the oscillation of the mass body about the pendulum fulcrum PF, the present inventors have estimated that the difference $\sqrt{(2*R)/(3*r)}-\sqrt{(R/r)}$ between the two orders of vibration is caused by the rotational motion of the roller 120 about the center of gravity G thereof, specifically, an inertial moment that is generated by the rotation of the roller 120 about the center of gravity G thereof that is in proportion to a square of a ratio $(r/r_r)$ between a radius $r_r$ of the roller 120 and a distance r from the pendulum fulcrum PF to the center of gravity G of the roller 120, and an expression (22) below has been induced. In the expression (22), "$q_r$" denotes the order of vibration of the roller 120, "$m_r$" denotes the mass of the roller 120, "$I_r$" denotes the inertial moment of the roller 120, "$m*r^2$" denotes the inertial moment generated by the translation of the roller 120, and "$I_r*(r/r_r)^2$" denotes the inertial moment generated by the rotation of the roller 120. The inventors have confirmed through verifications such as analyses that the evaluation described above is extremely reasonable and that the motion of the mass body in the centrifugal pendulum-type vibration absorbing device including the mass body that is coupled to the support member so as not only to oscillate about the pendulum fulcrum but also to revolve about the center of gravity thereof can be treated as the motion in which the rotational motion of the mass body about the center of gravity thereof is added to the motion of the mass body that oscillates about the pendulum fulcrum without revolving about the center of gravity thereof irrespective of the form (construction) of the mass body or the centrifugal pendulum-type vibration absorbing device.

[Math 10]

$$q_r = \sqrt{\frac{2R}{3r}} = \sqrt{\frac{R}{r \cdot \left(1 + \frac{I_r}{m_r \cdot r_r^2}\right)}} = \sqrt{\frac{m_r \cdot R \cdot r}{m_r \cdot r^2 + I_r \cdot \left(\frac{r}{r_r}\right)^2}} \quad (22)$$

On the other hand, a distance d1 along the guide surface 111 from a tangent ta of the guide surface 111 and the roller 120 with the roller 120 staying stationary at the oscillation center thereof to a tangent tb of the guide surface 111 and the roller 120 with the roller 120 having oscillated to one side of the oscillation range thereof is expressed as $d1=(r+r_r)*\phi$ from a sum $(r+r_r)$ of the distance r from the pendulum fulcrum PF to the center of gravity G of the roller 120 and the radius $r_r$ of the roller 120 and the rotational angle $\phi$ of the roller 120 (center of gravity G) about the pendulum fulcrum PF. In addition, a distance d2 along an outer circumferential surface of the roller 120 from the tangent ta of the guide surface 111 and the roller 120 with the roller 120 staying stationary at the oscillation center thereof to the tangent tb of the guide surface 111 and the roller 120 with the roller 120 having oscillated to the one side of the oscillation range thereof is expressed as $d2=r_r*(\phi+\theta)$ from a sum $(\phi+\theta)$ of the rotational angle $\phi$ of the roller 120 about the pendulum fulcrum PF and the revolving angle $\theta$ of the roller 120 about the center of gravity G thereof, on account of the translation of the roller 120 and the revolution of the roller 120 about the center of gravity G thereof and the radius $r_r$ of the roller 120. Then, in case the roller 120 rolls on the guide surface 111 without sliding thereon, the distance d1 coincides with the distance d2 (d1=d2), and a relationship of $\theta/\phi=r/r_r$ is established. Thus, by making use of this relationship, a ratio $(r/r_r)$ of the radius $r_r$ of the roller 120 to the distance r from the pendulum fulcrum PF to the center of gravity G of the roller 120 can be substituted with a ratio $(\theta/\phi)$ of the rotational angle $\phi$ of the roller 120 about the pendulum fulcrum PF to the revolving angle $\theta$ of the roller 120 about the center of gravity thereof. With this configuration, the inertial moment "$I_r*(r/r_r)^2$" generated by the revolution of the roller 120 about the center of gravity G thereof can be expressed as $I_r*(\theta/\phi)^2$ by using the ratio $(\theta/\phi)$ of the rotational angle $\phi$ of the roller 120 about the pendulum fulcrum PF and the revolving angle $\theta$ of the roller 120 about the center of gravity thereof.

Consequently, the order q of vibration of the mass body 12 in the centrifugal pendulum-type vibration absorbing device 10 including the mass body 12 that is coupled to the support member 11 so as not only to oscillate about the pendulum fulcrum PF but also to revolve about the center of gravity G thereof can be determined based on the order of vibration of the mass body that oscillates about the pendulum fulcrum without revolving the center of gravity thereof and further in consideration of the rotational motion of the mass body about the center of gravity thereof (inertial moment generated by the revolution of the mass body), that is, the rotational angle of the mass body about the pendulum fulcrum and the revolving angle of the mass body about the center of gravity thereof. Specifically speaking, in the event that the centrifugal pendulum-type vibration absorbing device 10 is not disposed in the liquid chamber that holds the liquid like the fluid transmission chamber 2 (in the event of the centrifugal pendulum-type vibration absorbing device 10 is of a dry type), when assuming that the order of vibration is "$q_z$," the mass of the mass body 12 is "m," the distance from the rotational center RC to the pendulum fulcrum PF is "R," the distance from the pendulum fulcrum PF to the center of gravity G of the mass body 12 is "r," the oscillation angle of the mass body 12 (center of gravity of the mass body 12), that is, the rotational angle of the mass body 12 about the pendulum fulcrum PF is "ϕ" the revolving angle of the mass body 12 about the center of gravity G thereof is "θ" (refer to FIG. 8), and the inertial moment of the mass body is "I," the order $q_z$ of vibration can be determined by using an expression (23) below. As a result of this, in the centrifugal pendulum-type vibration absorbing device 10 that is not disposed in the liquid chamber that holds the liquid such as the fluid transmission chamber 2, in the case of the oscillation angle ϕ of the mass body 12 being taken into consideration, the order q of vibration of the mass body 12 can be obtained as expressed by an expression (24) below. In the expression (24), "k" is also determined by the expression (9) or the expression (9') above.

Figure 8:
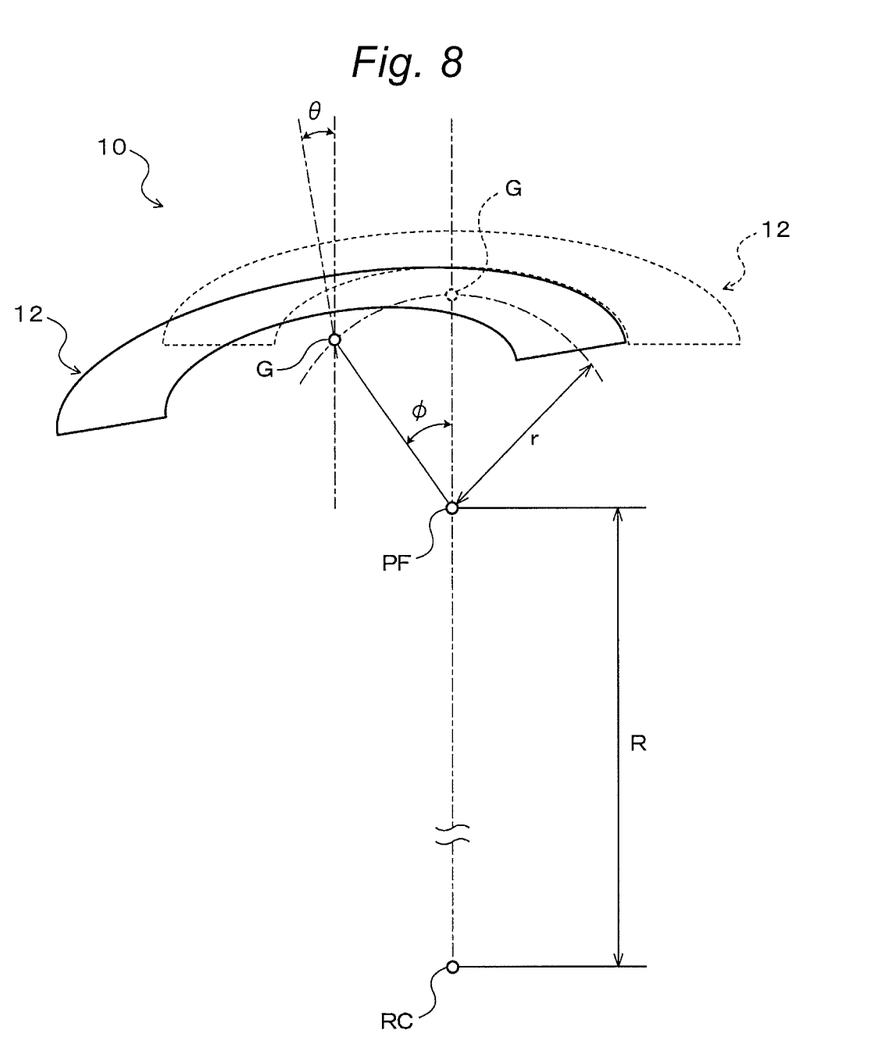
FIG. 8 is an explanatory diagram illustrating the method of setting the order of vibration of the mass body that makes up the centrifugal pendulum-type vibration absorbing device.

[Math 11]

$$q_z = \sqrt{\frac{m \cdot R \cdot r}{m \cdot r^2 + I \cdot \left(\frac{\theta}{\phi}\right)^2}} = \sqrt{\frac{R}{r} \cdot \frac{m \cdot r^2}{m \cdot r^2 + I \cdot \left(\frac{\theta}{\phi}\right)^2}} \qquad (23)$$

$$q = k \cdot \sqrt{\frac{R}{r} \cdot \frac{m \cdot r^2}{m \cdot r^2 + I \cdot \left(\frac{\theta}{\phi}\right)^2}} \qquad (24)$$

Further, in determining the order q of vibration of the mass body 12 in the centrifugal pendulum-type vibration absorbing device 10 that is disposed in the fluid transmission chamber 2 (liquid chamber) that holds the working oil (liquid), as in the expression (21) described above, the force acting on the mass body 12 by the centrifugal liquid pressure generated in the fluid transmission chamber 2 in association with the rotation of the driven member 83 as the rotary element should be taken into consideration. Namely, in introducing the value α indicating the force acting on the mass body 12 by the centrifugal liquid pressure in the expression (24), "R/r" in a rightmost term in the expression (24) should be substituted with "(R/r−α)" in consideration of the relationship of the simplified expression q=√(R/r) that denotes the order of vibration of the mass body in the centrifugal pendulum-type vibration absorbing device including the mass body that oscillates about the pendulum fulcrum without revolving about the center of gravity thereof with the expression (20) described above. Consequently, in the wet-type centrifugal pendulum-type vibration absorbing device 10 that is disposed in the fluid transmission chamber 2 that holds the working oil, the order q of vibration can be determined from an expression (25) below. Then, the centrifugal pendulum-type vibration absorbing device 10 may be designed so that the order q of vibration that is obtained from the expression (21), the expression (24) or the expression (25) satisfies the relational expression of the expression (10) or the expression (11).

[Math 12]

$$q = k \cdot \sqrt{\frac{m \cdot r^2 \left(\frac{R}{r} - \alpha\right)}{\left[m \cdot r^2 + I \cdot \left(\frac{\theta}{\phi}\right)^2\right]}} \qquad (25)$$

The order $q_{tag}$ of vibration that is dampened by the centrifugal pendulum-type vibration absorbing device 10 is dependent upon the number of cylinders of an engine to which the centrifugal pendulum-type vibration absorbing device 10 is coupled. For example, in the case of a three-cylinder engine, $q_{tag}$=1.5 and in the case of a four-cylinder engine, $q_{tag}$=2 (refer to FIG. 3). However, the order $q_{tag}$ of vibration to be dampened is not always dependent upon the number of cylinders of an engine, and hence, the order $q_{tag}$ of vibration may be made to take a value that is slightly greater or smaller than the value determined according to the number of cylinders of the engine in consideration of the form in which the damper mechanism or the lock-up clutch is used or the characteristics thereof. Further, in setting the order of vibration of the centrifugal pendulum-type vibration absorbing device 10 or the like, the value that is obtained from the expression (8), the expression (21), the expression (24) or the expression (25) is taken as a temporary order, and then, a final order of vibration may be obtained by increasing or decreasing (offsetting) the temporary order based on the results of a simulation or an experiment. In addition, in a dry-type starting system, for example, the fluid transmission device including the pump impeller, the turbine runner, the stator and the like may be omitted. Further, the dynamic damper may be an exclusive mass body, may be coupled to the intermediate member (intermediate element) or the drive member (input element) of the damper mechanism, and may be omitted from the starting system. In addition, the rotary element to which the centrifugal pendulum-type vibration absorbing device 10 is coupled is not limited to the driven member (output element) of the damper mechanism and hence may be the intermediate member or the drive member (input element) of the damper mechanism. Thus, the rotary element may be a rotational member (rotational shaft) of the transmission that is other than the rotary element that makes up the damper mechanism, as long as the rotary element is a rotational member that is mechanically coupled to the drive device to rotate.

As has been described heretofore, the centrifugal pendulum-type vibration absorbing device according to some preferred embodiments includes the support member that is coupled to the rotary element that rotates by means of power from the drive device and the mass body that is coupled to the support member so as to oscillate about the pendulum fulcrum, in which the centrifugal pendulum-type vibration absorbing device is designed so as to have the effective order $q_{eff}$ that is greater by the correction amount that is at least associated with the non-linearity of the order of the centrifugal pendulum-type vibration absorbing device that is dependent on the oscillation angle φ of the mass body than the order $q_{tag}$ of vibration that is generated in the drive device to be damped.

It is known that when assuming that the distance from the rotational center of the rotary element to the pendulum fulcrum is "R" and the distance from the pendulum fulcrum to the center of gravity of the mass body is "r", the order of vibration of the centrifugal pendulum-type vibration absorbing device including the mass body that oscillates about the pendulum fulcrum (mass body) is expressed as $q=\sqrt{(R/r)}$ in a simple fashion. The simplified expression that expresses the order of vibration like this is obtained on the understanding that the oscillation angle (rotational angle about the pendulum fulcrum, that is, the amplitude) of the mass body is extremely small. As a result of the inventors making every effort in carrying out studies on centrifugal pendulum-type vibration absorbing devices, it has been found out that since an oscillation angle of a mass body of a centrifugal pendulum-type vibration absorbing device when a rotary element and a support member rotate about a rotational center is too great to be ignored, it is not possible to set properly the order of vibration of the mass body by regarding the oscillation angle of the mass body as being extremely small. Consequently, in case the centrifugal pendulum-type vibration absorbing device is designed so as to have an effective order $q_{eff}$ that is greater by a correction amount that is at least associated with the non-linearity of an order of the centrifugal pendulum-type vibration absorbing device that is dependent on an oscillation angle φ of the mass body than an order $q_{tag}$ of vibration that is generated in the drive device to be damped in consideration of the oscillation angle of the mass body, it is possible to improve the vibration absorbing performance of the centrifugal pendulum-type vibration absorbing device by setting the order of vibration more properly.

The order of the centrifugal pendulum-type vibration absorbing device may decrease non-linearly as the oscillation angle φ of the mass body increases, and the correction amount may be determined so that the order of the centrifugal pendulum-type vibration absorbing device becomes the order $q_{tag}$ of the vibration that is generated in the drive device to be damped when the oscillation angle φ of the mass body is the predetermined target oscillating angle $\phi_{tag}$. By adopting the configuration described above, the vibration level at the rotation speed corresponding to the target oscillation angle $\phi_{tag}$ can be decreased extremely well.

Further, the correction amount may be determined so as to increase as the target oscillation angle $\phi_{tag}$ increases.

In addition, the correction amount may be determined so as to fall within the range from 0.05 or greater to 0.20 or smaller.

Further, the target oscillation angle $\phi_{tag}$ may be determined so as to fall within the range from 30° or greater and 70° or smaller.

In addition, the order of the centrifugal pendulum-type vibration absorbing device may change with the distance R from the rotational center of the rotary element to the pendulum fulcrum and the distance r from the pendulum fulcrum to the center of gravity of the mass body, and the distance R and the distance r of the centrifugal pendulum-type vibration absorbing device may be determined based on the effective order $q_{eff}$.

The order of the centrifugal pendulum-type vibration absorbing device may be determined from at least the coefficient k that is determined according to the expression (9'), the distance R from the rotational center of the rotary element to the pendulum fulcrum and the distance r from the pendulum fulcrum to the center of gravity of the mass body.

In the order setting method for the centrifugal pendulum-type vibration absorbing device according to preferred embodiments that includes the support member that is coupled to the rotary element that rotates by means of power from the drive device and the mass body that is coupled to the support member so as to oscillate about the pendulum fulcrum, in which the centrifugal pendulum-type vibration absorbing device is designed so as to have the effective order $q_{eff}$ that is greater by the correction amount that is at least associated with the non-linearity of the order of the centrifugal pendulum-type vibration absorbing device that is dependent on the oscillation angle φ of the mass body than the order $q_{tag}$ of vibration that is generated in the drive device to be damped.

As in the case with this order setting method, in case the centrifugal pendulum-type vibration absorbing device is designed so as to have the effective order $q_{eff}$ that is greater by the correction amount that is at least associated with the non-linearity of the order of the centrifugal pendulum-type vibration absorbing device that is dependent on the oscillation angle φ of the mass body than the order $q_{tag}$ of vibration that is generated in the drive device to be damped in consideration of the oscillation angle of the mass body, it is possible to improve the vibration absorbing performance of the centrifugal pendulum-type vibration absorbing device by setting the order of vibration more properly.

Then, the invention is not limited to the embodiment that has been described heretofore in any way. It goes without saying that the invention can be modified variously without departing from the spirit and scope of the invention. Further, the mode for carrying out the invention that has been described heretofore represents only the specific form of the invention that is described in the section of the means for solving the problem and is not intended to limit the factors of the invention that are described in the section of the means for solving the problem.

The invention claimed is:

1. A centrifugal pendulum vibration absorbing device comprising:
    a flange that is coupled to a rotary element that rotates using power from an engine; and
    a mass body that is coupled to the flange so as to oscillate about a pendulum fulcrum,
    wherein the flange and the mass body are designed to have an effective order $q_{eff}$ that is greater by a correction amount that is at least associated with the non-linearity of an order of the flange and the mass body that is dependent on an oscillation angle φ of the mass body than an order $q_{tag}$ of vibration that is generated in the engine to be damped.

2. The centrifugal pendulum vibration absorbing device according to claim 1,
    wherein the order of the flange and the mass body decreases non-linearly as the oscillation angle φ of the mass body increases, and
    the correction amount is determined so that the order of the flange and the mass body becomes the order $q_{tag}$ of the vibration that is generated in the engine to be damped when the oscillation angle φ of the mass body is a predetermined target oscillating angle $\phi_{tag}$.

3. The centrifugal pendulum vibration absorbing device according to claim 2,
    wherein the correction amount is determined so as to increase as the target oscillation angle $\phi_{tag}$ increases.

4. The centrifugal pendulum vibration absorbing device according to claim 3,
wherein the correction amount is determined so as to fall within a range from 0.05 or greater to 0.20 or smaller.

5. The centrifugal pendulum vibration absorbing device according to claim 4,
wherein the target oscillation angle $\phi_{tag}$ is determined so as to fall within a range from 30° or greater to 70° or smaller.

6. The centrifugal pendulum vibration absorbing device according to claim 5,
wherein the order of the flange and the mass body changes with a distance R from a rotational center of the rotary element to the pendulum fulcrum and a distance r from the pendulum fulcrum to a center of gravity of the mass body, and
the distance R and the distance r are determined based on the effective order $q_{eff}$.

7. The centrifugal pendulum vibration absorbing device according to claim 6,
wherein the order of the flange and the mass body is determined from at least a coefficient k that is determined according to a mathematical expression below, the distance R from the rotational center of the rotary element to the pendulum fulcrum and the distance r from the pendulum fulcrum to the center of gravity of the mass body, the coefficient k is calculated as follows:

$$k = \frac{2}{\pi} \cdot \int_0^{\frac{\pi}{2}} \frac{1}{\sqrt{1 - \sin^2 \frac{\phi_{tag}}{2} \cdot \sin^2 \phi}} d\phi.$$

8. The centrifugal pendulum vibration absorbing device according to claim 1,
wherein the correction amount is determined so as to increase as the target oscillation angle $\phi_{tag}$ increases.

9. The centrifugal pendulum vibration absorbing device according to claim 1,
wherein the correction amount is determined so as to fall within a range from 0.05 or greater to 0.20 or smaller.

10. The centrifugal pendulum vibration absorbing device according to claim 1,
wherein the target oscillation angle $\phi_{tag}$ is determined so as to fall within a range from 30° or greater to 70° or smaller.

11. The centrifugal pendulum vibration absorbing device according to claim 1,
wherein the order of the flange and the mass body changes with a distance R from a rotational center of the rotary element to the pendulum fulcrum and a distance r from the pendulum fulcrum to a center of gravity of the mass body, and
the distance R and the distance r are determined based on the effective order $q_{eff}$.

12. The centrifugal pendulum vibration absorbing device according to claim 1,
wherein the order of the flange and the mass body is determined from at least a coefficient k that is determined according to a mathematical expression below, the distance R from the rotational center of the rotary element to the pendulum fulcrum and the distance r from the pendulum fulcrum to the center of gravity of the mass body, the coefficient k is calculated as follows:

$$k = \frac{2}{\pi} \cdot \int_0^{\frac{\pi}{2}} \frac{1}{\sqrt{1 - \sin^2 \frac{\phi_{tag}}{2} \cdot \sin^2 \phi}} d\phi.$$

13. An order setting method for a centrifugal pendulum vibration absorbing device comprising a flange that is coupled to a rotary element that rotates using power from an engine and a mass body that is coupled to the flange so as to oscillate about a pendulum fulcrum,
wherein the flange and the mass body are designed to have an effective order $q_{eff}$ that is greater by a correction amount that is at least associated with the non-linearity of an order of the flange and the mass body that is dependent on an oscillation angle of the mass body than an order $q_{tag}$ of vibration that is generated in the engine to be damped.

* * * * *